United States Patent [19]
Lanius

[11] Patent Number: 5,136,800
[45] Date of Patent: Aug. 11, 1992

[54] DECOY AND A METHOD FOR MAKING A DECOY

[75] Inventor: Charles A. Lanius, Prairie Du Sac, Wis.

[73] Assignee: Flambeau Products Corporation, Middlefield, Ohio

[21] Appl. No.: 637,360

[22] Filed: Jan. 4, 1991

[51] Int. Cl.⁵ .......................................... A01M 31/06
[52] U.S. Cl. ............................................. 43/3; 43/2
[58] Field of Search .......................................... 43/3, 2

[56] References Cited

U.S. PATENT DOCUMENTS

| | | | |
|---|---|---|---|
| 2,391,475 | 12/1945 | Newhardt | 43/3 |
| 2,495,720 | 1/1950 | Heymann | 43/3 |
| 2,755,588 | 7/1956 | Johnson | 43/3 |
| 3,047,972 | 8/1962 | Taylor | 43/3 |
| 3,350,808 | 11/1967 | Mitchell | 43/3 |
| 3,478,459 | 11/1969 | Gazlski | 43/3 |
| 3,916,553 | 11/1975 | Lynch et al. | 43/3 |
| 4,023,297 | 5/1977 | Jorgensen | 43/3 |
| 4,172,335 | 10/1979 | Farmer | 43/3 |
| 4,435,913 | 3/1984 | Messina | 43/3 |
| 4,651,458 | 3/1987 | Lanius | 43/3 |
| 5,003,718 | 4/1991 | Lenert et al. | 43/3 |

Primary Examiner—Richard K. Seidel
Assistant Examiner—Chuck Y. Mah
Attorney, Agent, or Firm—Michael, Best & Friedrich

[57] ABSTRACT

A bird decoy which can be used either on land or in water. This decoy includes a body portion, a neck portion and a head portion. The body portion includes an integral flotation ring for supporting the decoy when the decoy is used on water. The bottom of the body portion defines a central, downwardly-opening cavity which is adapted to receive another body portion in a stackable relationship.

4 Claims, 2 Drawing Sheets

DECOY AND A METHOD FOR MAKING A DECOY

FIELD OF THE INVENTION

This invention relates to decoys, and more particularly, to stackable decoys which can be used on both land and water.

BACKGROUND PRIOR ART

A prior art bird decoy is illustrated in U.S. Pat. No. 4,172,335 issued Oct. 30, 1979 to Farmer. Such decoys are commonly supported on the ground by stakes or other supports and represent a bird in either a feeding position, with the head lowered, or a sentry position, with the head upright.

Other prior art decoys are shown in U.S. Pat. No. 3,350,808 issued Nov. 7, 1967 to Mitchell and U.S. Pat. No. 3,916,553 issued Nov. 4, 1975 to Lynch et al. These decoys include mechanically driven devices and portray the bird in either the sentry or feeding positions. These decoys cannot be used on both land and water. Further, these decoys cannot be stacked together for transport. Stacking of decoys can be an important feature in that a hunter may require a large number of decoys to create a suitable arrangement to attract geese, ducks, etc., and the ability to stack the decoys facilitates transport of the decoys. This is particularly true in the case of large goose decoys.

U.S. Pat. No. 4,651,458 issued Mar. 24, 1987 to Lanius illustrates a decoy that can be used on either land or water. However, decoys of the type shown in that patent are not stackable.

A decoy which is capable of use on both land and water and which is also stackable is illustrated in U.S. Pat. No. 4,435,913 issued Mar. 13, 1984 to Messina. This decoy is made of three members and it requires disassembly before stacking.

SUMMARY OF THE INVENTION

The present invention provides an improved bird decoy which will float on water and which can also be used on the ground. The decoy of the invention is stackable or nestable for convenient transport and includes structure permitting the decoy to be used to simulate a bird in either a feeding position or in a sentry position.

More particularly, the decoy of the invention includes a one-piece body, a neck adapted to be removably attached to the body and for supporting a head. The bottom portion of the one-piece body defines a central, downwardly-opening cavity adapted to receive an upper portion of the body of another decoy in stackable relation. In a preferred embodiment of the invention the body of the decoy can be a one-piece hollow molded structure, the molded body including a hollow ring surrounding the base of the body, the hollow ring providing for flotation of the body. In a preferred embodiment of the invention one end of the neck portion of the decoy is removably housed in an aperture in the top of the body portion and the head portion is supported by the other end of the neck portion. Either end of the neck can be secured in the aperture in the top of the body and either end of the neck can support the head portion. By alternating which end of the neck is secured in the aperture, the decoy can be assembled in either a sentry or feeding position.

A principal feature of the invention is a bird decoy which can be used on both the ground and water.

Another feature of the invention is a bird decoy which is stackable with a minimum of disassembly and assembly. The ability to stack the decoy facilitates transportation and storage.

Another feature of the invention is a bird decoy having structural components which can be easily rearranged such that the decoy imitates a bird in either a feeding or sentry position.

Another feature of the invention is a bird decoy which can be readily manufactured.

Other principal features and advantages of the invention will become apparent to those skilled in the art upon review of the following detailed description, the claims and the drawings.

DESCRIPTION OF THE PREFERRED EMBODIMENT

Figure 1:
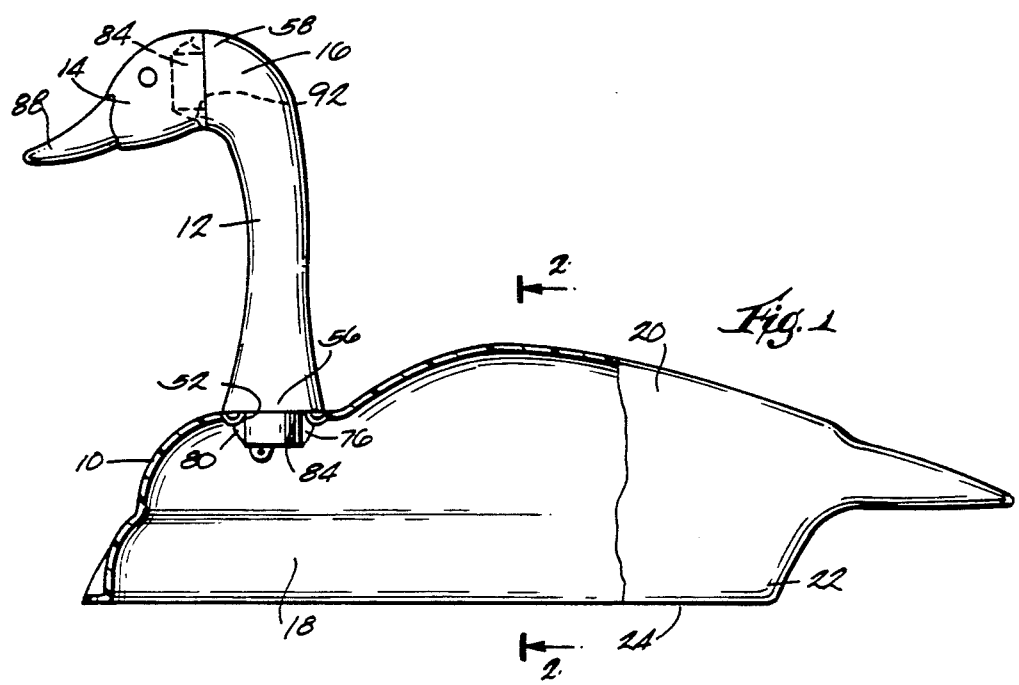
FIG. 1 is a side elevation view, partial in section, of a bird decoy embodying the invention.

Illustrated in FIG. 1 is a decoy embodying the invention and including a body 10, a neck 12 supported by the body and a head 14 supported by a upper end 16 of the neck 12.

Figure 2:
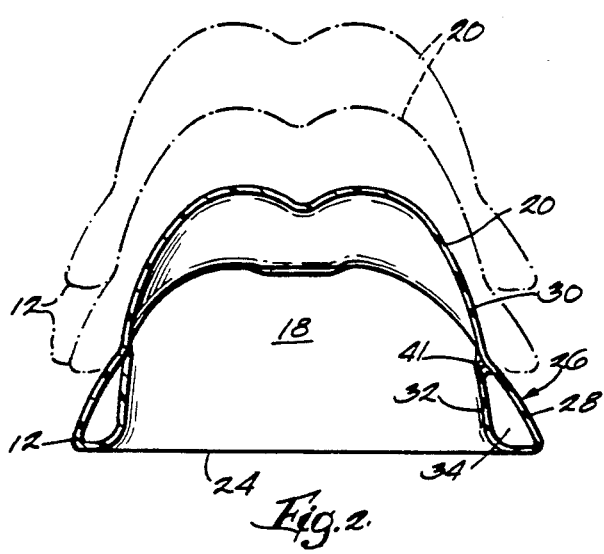
FIG. 2 is a cross section end view of the bird decoy in FIG. 1.

The body 10 comprises a one-piece hollow molded shell having a central cavity 18 open at the bottom. In a preferred form of the invention the body 10 can be manufactured by blow molding as will be described in greater detail hereinafter. The body 10 has an external configuration intended to closely resemble the outline of a goose in a sitting or swimming position and generally includes a top portion 20 and a base 22 having a generally flat bottom surface 24 which can support the decoy when the decoy is used on the ground. The base 22 also includes a generally hollow ring 26 surrounding at least a portion of the body 10 and intended to provide buoyancy or flotation of the decoy when the decoy is on water. In a preferred form of the invention the hollow ring 26 is an integral molded portion of the body. The ring 26 includes an outer wall 28 which is continuous and integral with the sides 30 of the body, and an inner wall 32 spaced inwardly from the outer wall 28 and defining a hollow cavity 34 therebetween. As shown in FIG. 2 the lower edge of the inner wall defines an opening adapted to house an upper portion of the body of another decoy and and the sides 30 define a rearward opening adapted to accommodate the tail section of the other decoy such that the decoy bodies 10 can be stacked together one on top of another.

Figures 5, 8:
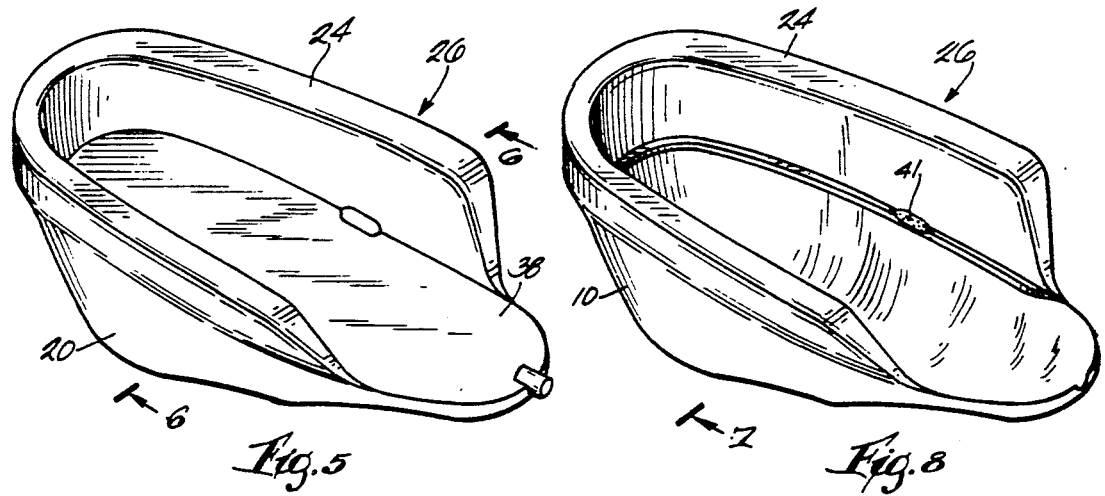
FIG. 5 is an inverted perspective view of a portion of the bottom of the body of the bird decoy shown in FIG. 1 following molding of the bottom portion and prior to removal of a bottom wall of the molded body portion.
FIG. 8 is a view similar to FIG. 5 and showing the bottom wall of the body removed.
Figure 6:
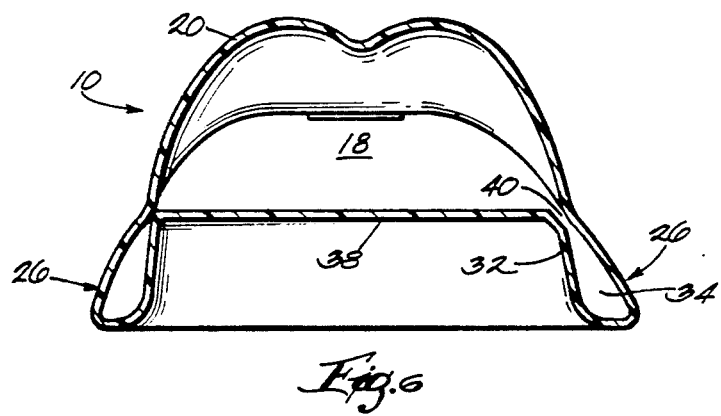
FIG. 6 is a view similar to FIG. 2 and showing the body portion following the molding of the body portion.

FIG. 5 through 8 illustrate a preferred process for forming the body 10 of the decoy of the invention and wherein the body is initially formed by blow molding a hollow plastic body as illustrated in FIGS. 5 and 6. The hollow plastic body can be comprised of any plastic material which can be conveniently molded in a blow molding process. The molded body includes a top portion 20, an integral hollow ring 26 forming the base of the body and a generally planar bottom wall 38 housed within the body and extending from a top portion of the inner wall 32 of the ring 26 at one side of the body to the top portion of the inner wall 32 of the ring at the opposite side of the body to thereby join the top portion of the ring 26.

As best illustrated in FIG. 6 the blow molded body 10 when in an unfinished state defines an enclosed chamber including the central cavity 18, the flotation cavity 34 and at least one passage or channel 40 communicating between the central cavity 18 and the flotation cavity 34. This passage or channel 40 is provided to permit blow molding of the entire body as a one piece unit.

In a preferred form of the invention the upper edge of the inner sidewall 32 is bonded to the inside surface of the side of the body during the molding process except in the area of the channels or passages 40.

Figure 7:
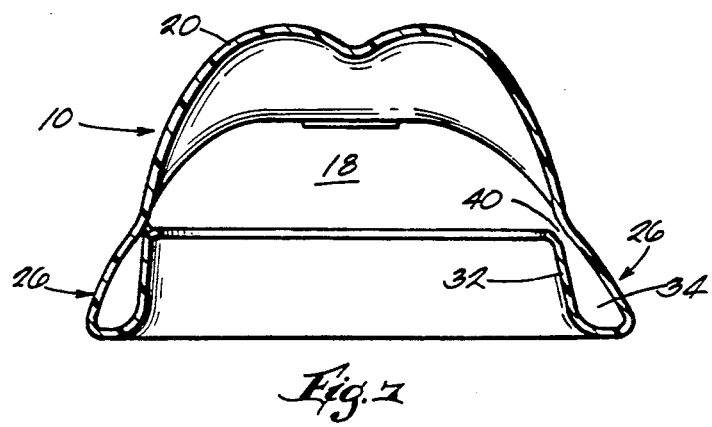
FIG. 7 is a view similar to FIG. 6 and showing the molded bottom wall removed.

As best shown in FIGS. 7 and 8, subsequent to the blow molding operation the bottom wall 38 is removed by routing or cutting through the bottom wall adjacent to the inner wall 32 of the ring. Removal of the bottom wall 38 provides the body 10 with a downwardly opening central cavity 18 adapted to house the upper portion of another body 10 when the bodies are stacked together as shown in FIG. 2 and thus facilitates stacking of the bodies.

Following the operation to remove the bottom wall, the channel or channels 40 are filled with an adhesive or plastic material 41 (FIG. 2) to close the channels 40 and such that the hollow ring will define a closed water tight hollow flotation chamber 34.

While in the illustrated construction the flotation ring 26 surrounds a substantial portion of the body 10, in other applications the flotation ring 26 could be comprised of discrete or separate flotation chambers positioned around the periphery of the body.

The top portion 20 of the body 10 also includes an aperture 52 adapted to accept one of the opposite ends 56 or 58 of the neck portion 12. The aperture 52 is circular and has two slots 60 and 64. Two semi-circular rings 68 and 72 surround the aperture 52. These rings 68 and 72 are provided with downwardly facing, convex surfaces adapted to be engaged by tabs 76 and 80 fixed to the neck portion 12 to secure the neck portion 12 to the body.

Figure 4:
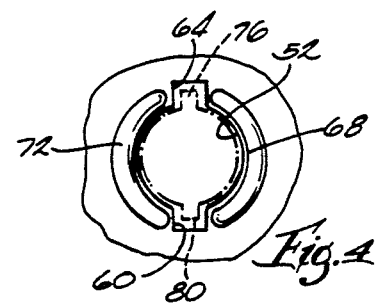
FIG. 4 is a plan view of the neck attachment shown in FIG. 3.
Figure 3:
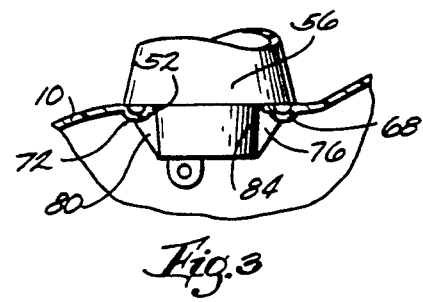
FIG. 3 is an enlarged view of the neck attachment arrangement illustrated in FIG. 1.

The neck portion 12 is also preferably formed of a blow molded plastic. Both ends 56 and 58 have a tapered extension 84 and tabs 76 and 80 fixed to opposites sides of the tapered extension 84. These tabs 76 and 80 are adapted to frictionally engage the semi-circular rings 68 and 72 surrounding the aperture 52. The tabs 76 and 80 are inserted through the slots 60 and 64 as shown in FIG. 4. The neck portion 12 is twisted so that the tabs 76 and 80 frictionally engage the semi-circular rings 68 and 72 and hold the neck portion in place. If the first end 56 of the neck portion 12 is placed into the aperture 52 and the head 14 is supported by the opposite end of the neck, the decoy is in a sentry position as illustrated in FIG. 1. If the second end 58 of the neck portion 12 is placed into the aperture 52, the decoy is in a feeding position.

The head portion 14 of the decoy, which is also preferably formed of a blow molded plastic, is designed to simulate a bird's head. The head portion 16 includes a bill 88 at one end and an opening 92 at the other end. The opening 92 has two slots and is encompassed by two semi-circular rings identical to the slots 60 and 64 and the rings 68 and 72 in the body portion. The head portion 16 is placed on either the first end 56 or the second end 58 of the neck portion 12. The slots of the head portion 16 are placed over the tabs 76 and 80 of either the first end 56 or the second end 58 of the neck portion 12 and the head portion 16 is then twisted so the tabs 76 and 80 engage the semi-circular rings or 68 and 72 to lock the head in place.

Various features of the invention are set forth in the following claims.

I claim:

1. A bird decoy comprising:
    a hollow integrally molded body formed by blow molding, said body defining a central downwardly opening cavity adapted to house, in nested relation, the identical body of another bird decoy, said body including a top portion, side portions, and a hollow ring molded integrally with at least one of said side portions, said hollow ring defining a flotation cavity, and said body further defining a passage communicating between said central cavity and said flotation cavity, said passage being plugged with a material so that said flotation cavity forms a water tight flotation chamber,
    a neck having opposite ends, one of said opposite ends being removeably supported by said hollow molded body, and
    a head supported by the other of said opposite ends of said neck.

2. A method for making a bird decoy, said method comprising the steps of:
    blow-molding a hollow body defining a chamber having a central cavity, a flotation cavity, and a passage communicating between the central cavity and the flotation cavity, the hollow body having a top portion, side portions extending downwardly from the top portion, a hollow ring molded integrally with the side portions, the hollow ring defining the flotation chamber, and a bottom wall extending from one of the side portions and the hollow ring, and
    removing the bottom wall so that the central cavity is downwardly opening and so that the hollow body is adapted to house, in nested stacked relation, the identical body of another bird decoy.

3. A method for making a bird decoy as set forth in claim 2 wherein said removing step is followed by the step of filling the passage with a material so that the flotation cavity is a water tight chamber.

4. A method for making a bird decoy as set forth in claim 3 wherein the hollow ring surrounds at least a portion of the body, and wherein the bottom wall extends between a portion of the hollow ring at one side of the body and a portion of the hollow ring at an opposite side of the body.

* * * * *